(12) United States Patent
Clark

(10) Patent No.: US 9,197,106 B2
(45) Date of Patent: Nov. 24, 2015

(54) MAGNET RETAINING ARRANGEMENTS

(75) Inventor: Paul Eaton Clark, Warwickshire (GB)

(73) Assignee: GE Energy Power Conversion Technology Limited (GB)

( * ) Notice: Subject to any disclaimer, the term of this patent is extended or adjusted under 35 U.S.C. 154(b) by 301 days.

(21) Appl. No.: 13/431,481

(22) Filed: Mar. 27, 2012

(65) Prior Publication Data

US 2012/0248916 A1 Oct. 4, 2012

(30) Foreign Application Priority Data

Apr. 1, 2011 (EP) ..................................... 11002715

(51) Int. Cl.
*H02K 1/27* (2006.01)
*H02K 1/30* (2006.01)
*H02K 1/28* (2006.01)
*H02K 1/32* (2006.01)

(52) U.S. Cl.
CPC .................. *H02K 1/30* (2013.01); *H02K 1/278* (2013.01); *H02K 1/32* (2013.01)

(58) Field of Classification Search
CPC .................................. H02K 1/278; H02K 1/28
USPC ........................................ 310/156.12–156.15
See application file for complete search history.

(56) References Cited

U.S. PATENT DOCUMENTS

| | | | | |
|---|---|---|---|---|
| 3,849,683 | A * | 11/1974 | Leistner | 310/216.086 |
| 2004/0245883 | A1* | 12/2004 | Mitcham et al. | 310/216 |
| 2007/0290564 | A1* | 12/2007 | Clark | 310/156.29 |
| 2009/0218900 | A1* | 9/2009 | Dickes | 310/156.12 |
| 2009/0302702 | A1* | 12/2009 | Pabst et al. | 310/156.12 |
| 2011/0133594 | A1 | 6/2011 | Atallah et al. | |
| 2011/0285216 | A1* | 11/2011 | Kurronen | 310/45 |
| 2011/0285237 | A1* | 11/2011 | Amari et al. | 310/156.07 |
| 2012/0001506 | A1* | 1/2012 | Orban et al. | 310/87 |
| 2012/0025937 | A1* | 2/2012 | Clark | 335/219 |
| 2013/0187507 | A1* | 7/2013 | Fouquart et al. | 310/156.15 |

FOREIGN PATENT DOCUMENTS

CN 1783650 6/2006
CN 101090213 12/2007
(Continued)

OTHER PUBLICATIONS

European Search Report EP11002715, Aug. 31, 2011.
(Continued)

*Primary Examiner* — Terrance Kenerly
(74) *Attorney, Agent, or Firm* — Parks Wood LLC

(57) ABSTRACT

The present invention provides a permanent magnet rotor arrangement for a rotating electrical machine including a rotor body having an outer rim. A circumferential array of magnet carriers is mounted to the rotor body by fixing members and support members and is spaced apart from the rotor body in the radial direction to define a series of axially gaps or spaces which can optionally be used as passages for cooling air. At least one pole piece made of permanent magnet material is located adjacent to a surface of each magnet carrier. The magnet carriers and pole pieces preferably have a laminated or divided construction to virtually eliminate eddy currents that may be particularly problematic in certain types and construction of electrical machine. The flux path between adjacent pole pieces flows in the circumferential direction within the magnet carriers and does not use the rotor body.

20 Claims, 4 Drawing Sheets

(56) References Cited

FOREIGN PATENT DOCUMENTS

| | | |
|---|---|---|
| DE | 102004031329 | 1/2006 |
| DE | 102007006986 | 6/2008 |
| EP | 1646126 | 4/2006 |
| WO | WO9638902 | 12/1996 |
| WO | WO2010103694 | 9/2010 |

OTHER PUBLICATIONS

Office Action (translation) issued in connection with CN Application No. 201210091174.4 (May 27, 2015).

* cited by examiner

MAGNET RETAINING ARRANGEMENTS

CROSS REFERENCE TO RELATED APPLICATION

This application claims priority to European Patent Application No. 11002715.8, filed Apr. 1, 2011.

FIELD OF THE INVENTION

The present invention relates to a magnet retaining arrangements, and in particular to arrangements for retaining permanent magnets on a rotor body of a rotating electrical machine such as a motor or generator.

BACKGROUND TO THE INVENTION

EP 1860755 discloses a permanent magnet rotor arrangement where a circumferential array of magnet carriers is affixed directly to the rim of a rotor body or drum. A pole piece made of permanent magnet material is located adjacent to a surface of each magnet carrier and in a channel formed in an associated inverted U-shaped pole piece retainer. The pole piece retainer is made of non-magnetic material.

Such a rotor arrangement is particularly suitable for rotors in which the flux passes through the pole pieces predominantly in the radial direction and into the rim of the rotor body. In other words, the rotor arrangement is deliberately designed so that the flux path between adjacent pole pieces flows through the body or drum of the rotor in the circumferential direction.

It has now been appreciated that for certain types of machine such a rotor arrangement can result in unacceptably high eddy current losses.

SUMMARY OF THE INVENTION

The present invention provides an improved permanent magnet rotor arrangement for a rotating electrical machine which in a preferred arrangement attempts to significantly reduce eddy current losses. More particular, the permanent magnet rotor arrangement comprises a rotor body (or rotor drum), a circumferential array of magnet carriers spaced apart from the rotor body in the radial direction and secured to the rotor body for rotation therewith, each magnet carrier having a surface, and at least one pole piece made of permanent magnet material located adjacent to the surface of each magnet carrier.

The rotor arrangement can be such that the rotor body is located within a fixed stator. In this case, the circumferential array of magnet carriers is preferably spaced apart from a radially outer surface of the rotor body and each pole piece is preferably located adjacent to a radially outer surface of each magnet carrier. However, the rotor arrangement can also be such that the rotor body is located outside a fixed stator. In this case, the circumferential array of magnet carriers is preferably spaced apart from a radially inner surface of the rotor body and each pole piece is preferably located adjacent to a radially inner surface of each magnet carrier.

The permanent magnet material from which the pole piece is formed can be brittle and prone to fracture and corrosion. This is particularly the case when the permanent magnet material is high-energy-product or rare earth magnet material. A pole piece wrapper or retainer can therefore be used to enclose the pole piece to provide environmental (and optionally also mechanical) protection for the permanent magnet material and contains the permanent magnet material in the event that the material forming the pole piece fractures or disintegrates. It also protects the permanent magnet material from external contaminants, thereby minimising the risk of corrosion.

Each pole piece retainer or wrapper may be affixed to the associated magnet carrier and may optionally extend completely around both the pole piece and the associated magnet carrier.

Flux passes through the pole pieces predominantly in the radial direction. Unlike the rotor arrangement of EP 1860755, in the present invention the flux path between circumferentially adjacent pole pieces of opposite polarity does not pass into the rotor body. In other words the magnet carriers are not designed to provide a flux path into the rotor body or drum.

The magnet carriers may be mounted in abutment with each other in the circumferential direction to form substantially a continuous, annular, magnet carrier assembly that is spaced apart from the rotor body in the radial direction. However, there may be small gaps between circumferentially adjacent magnet carriers to accommodate the pole piece retainers or wrappers and to allow for manufacturing variations, for example. In an arrangement where flux flows between adjacent magnet carriers in the circumferential direction then the reluctance of the gaps can be allowed for in the design of the magnet retaining assemblies.

The advantages of the rotor arrangement are simplicity of construction, the ability to pre-assemble complete pole arrangements and the ease with which the pole pieces may be removed and replaced if this is desirable.

Each magnet carrier preferably extends axially along the rim of the rotor body. Each magnet carrier can be formed from a single piece of magnetic material such as steel, for example, but in order to reduce eddy currents it is generally preferred that each magnet carrier has a laminated construction. The magnet carriers can be made of an axial stack of laminations. Each lamination—typically about 0.5 mm thick—can be formed from a suitable type of lamination steel and coated with a suitable insulating coating or film. The laminations can be stamped out from planar lamination steel and then assembled together to form a magnet carrier using conventional manufacturing techniques.

Each pole piece preferably extends axially along the rim of the rotor body.

In some cases, each magnet carrier will carry two or more circumferentially adjacent axially extending pole pieces of permanent magnet material (i.e. arranged in a side by side relationship on a single magnet carrier). The pole pieces carried by each magnet carrier can be enclosed by a single pole piece wrapper or retainer. However, a separate pole piece wrapper or retainer for each pole piece could also be provided. The overall permanent magnet rotor arrangement will be constructed so that circumferentially adjacent pole pieces have opposite polarities (e.g. alternating North and South polarities) irrespective of how many pole pieces are carried on each magnet carrier. For example, if each magnet carrier has two axially extending pole pieces arranged side by side then one pole piece will define a North pole of the rotor and the other pole piece will define a South pole of the rotor.

Each pole piece may consist of a axial array of individual pole pieces located in abutment with each other in the axial direction but in order to reduce eddy currents it is generally preferred that each pole piece is divided into electrically isolated blocks of permanent magnet material either along their axial length, their circumferential width or both, and optionally also along their radial thickness. In other words, each pole piece consists of several smaller blocks of permanent magnetic material. Individual adjacent blocks of permanent magnetic material may be separated by at least one non-magnetic plate or lamination to which the blocks may optionally be bonded or affixed. The non-magnetic plate or lamination may extend into the magnet carrier, i.e. the magnet carriers may be formed from a series of axial stacks of laminations with adjacent stacks being separated by a non-magnetic plate or lamination that is used to separate individual adjacent blocks of permanent magnetic material. The non-magnetic plates or laminations may support the pole piece retainer or wrapper which may optionally be affixed to them, e.g. by welding or an adhesive. If the non-magnetic plates or laminations are not used then some form of insulation will preferably still be provided between the blocks of magnetic material but this could be in the form of a coating, a paint or spacers formed from a suitable electrically non-conducting material. In one arrangement a supporting structure with voids for receiving the blocks of permanent magnet material may be formed out of non-magnetic plates or laminations, and optionally also the pole piece wrapper or retainer. The voids are filled with one or more blocks and the assembled supporting structure mounted to a magnet carrier.

The magnet carriers can be permanently or releasably affixed to the rotor body using any suitable means. In one possible arrangement the magnet carriers can be mounted on an array of circumferentially spaced support members that are made of a magnetic or non-magnetic material and which space the magnet carriers apart from the rotor body in the radial direction to define a space or void therebetween. A small amount of flux may flow into the support members but the flux path does not extend into the rotor body. Non-magnetic spacers may optionally be provided between the support members and the rotor body or between the support members and the magnet carrier to prevent the flux from entering the rotor body. The non-magnetic spacers may also be insulated to prevent the flow of eddy currents between adjacent magnet carriers. Each individual magnet carrier may be mounted on an array of axially spaced support members.

The support members are optionally affixed to the rotor body and/or the magnet carriers by mechanical fixings such as bolts or screws, by a suitable shaped profile (e.g. a dovetail that is slidably received in a complimentary slot), by tapered keys, or by welding, for example. A support member that is affixed to the rotor body may be referred to as a fixing member. Fixing members do not have to contact the rotor—they might be spaced apart from the rotor body and be pulled down by mechanical fixings, for example. The support members may also be integrally formed with either the rotor body or the magnet carriers. A variety of different support members (or fixing members) can be used for each magnet carrier.

The space between the magnet carriers and the rim of the rotor body can be used as passages for cooling air. Radially extending passages may be provided within the rotor arrangement to allow the cooling air to enter the air gap between the rotor body and the stator. This can be particularly useful in situations where the space between adjacent pole piece assemblies is not sufficient to carry enough cooling air for the electrical machine. Cooling air can be introduced into the axially extending passages between the magnet carriers and the rotor body from one or both axial ends of the electrical machine.

Each pole piece can be affixed to its associated magnet carrier using any suitable means. For example, the pole pieces can be adhesively bonded. A combination of one or more fixing means can be used.

The present invention further provides a permanent magnet rotor arrangement comprising: a rotor body; a circumferential array of magnet carriers secured to the rotor body for rotation therewith, each magnet carrier having a surface, and at least one pole piece made of permanent magnet material located adjacent to the surface of each magnet carrier, wherein the magnet carriers have a laminated construction. The magnet carriers may be spaced apart from the rotor body in the radial direction and other optional features of the permanent magnet rotor arrangement are as described above.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
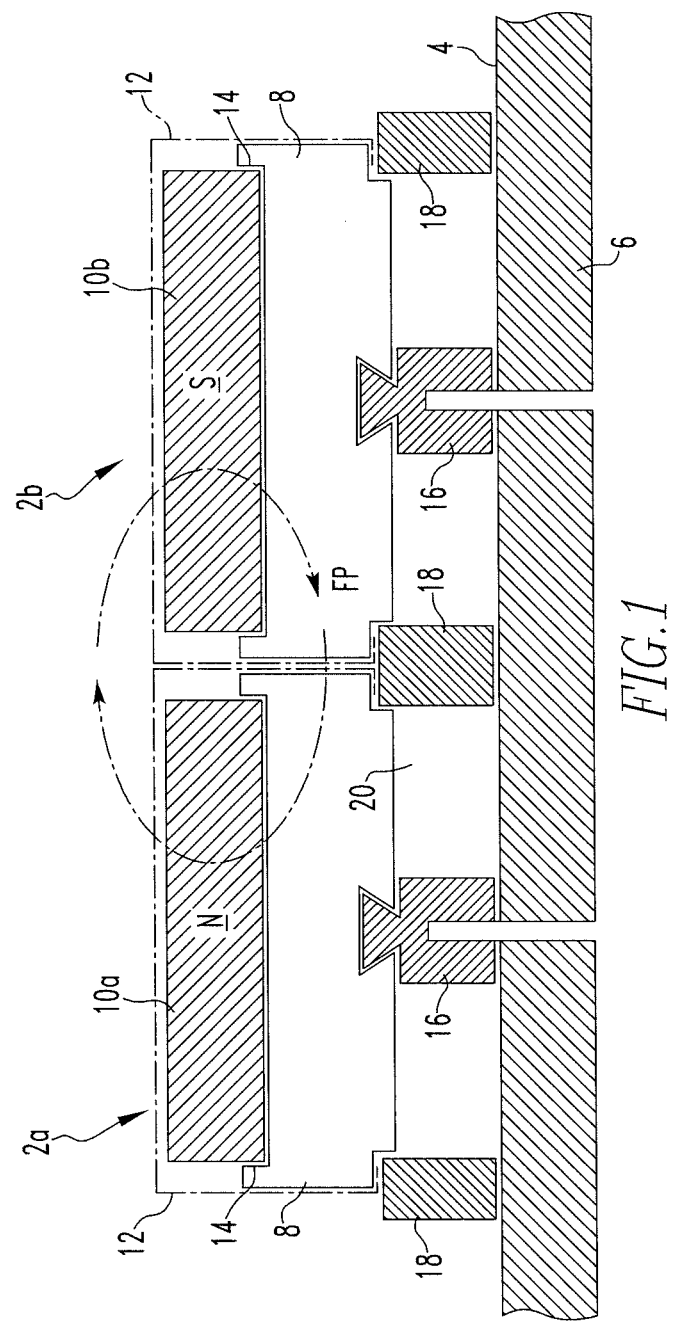
FIG. 1 shows an axial end view of part of a first permanent magnet rotor according to the present invention.

With reference to FIG. 1 a permanent magnet rotor arrangement for an electrical machine includes a circumferential array of magnet retaining assemblies 2 (only two of which are shown) that are secured around the radially outer surface 4 of a rotor drum 6. Each magnet retaining assembly 2 includes a laminated magnet carrier 8. The individual laminations are stamped out from magnetic lamination steel and assembled together to form the magnet carrier. A first magnet retaining assembly 2a includes a pole piece 10a that defines a North pole of the rotor. A second magnet retaining assembly 2b includes a pole piece 10b that defines a South pole of the rotor. The overall permanent magnet rotor arrangement is constructed so that circumferentially adjacent pole pieces define alternating North and South poles of the rotor. Although in the arrangement shown in FIG. 1 each magnet carrier 8 carries a single axially extending pole piece 10, it will be readily appreciated that each magnet carrier may carry two or more pole pieces arranged side by side. Such an alternative arrangement is described below with reference to FIG. 4. The pole pieces 10 are enclosed by a pole piece wrapper 12 made of a non-magnetic material which provides environmental protection for the permanent magnet material.

Each pole piece 10 is located in a shallow recess 14 formed in the radially outer surface of each magnet carrier 8.

Each magnet carrier 8 is secured relative to the rotor drum by at least one non-magnetic fixing member 16. In practice, each magnet carrier 8 will typically be secured using an axial array of spaced fixing members only one of which is shown. The fixing members 16 are designed to be bolted to the rotor drum and are secured to the magnet carriers 8 by means of a dovetail joint but other fixing methods are possible. The magnet retaining assemblies can be inserted and removed without dismantling the electrical machine. Each magnet carrier 8 is also supported by at least one non-magnetic support member 18. Again, in practice, each magnet carrier will typically be supported by an axial array of spaced support members. The support members may be located at the circumferential edges of each magnet carrier 8 and support members may be shared by circumferentially adjacent magnet carriers as shown in FIG. 1.

The fixing members 16 and support members 18 mount each magnet carrier 8 so that it is radially spaced apart from the outer surface 4 of the rotor drum 6. The radial gaps or spaces 20 between the magnet carriers 8 and the rotor drum 6 define axial passages that can be used to carry ventilation or cooling air into the body of the electrical machine. Flux passes through the pole pieces 10 substantially in the radial direction and flows in the circumferential direction between circumferentially adjacent magnet carriers 8. The flux path FP does not pass into the rotor drum 6 because the magnet carriers 8 are radially spaced apart from the outer surface of the rotor drum by a sufficient distance.

Figure 2:
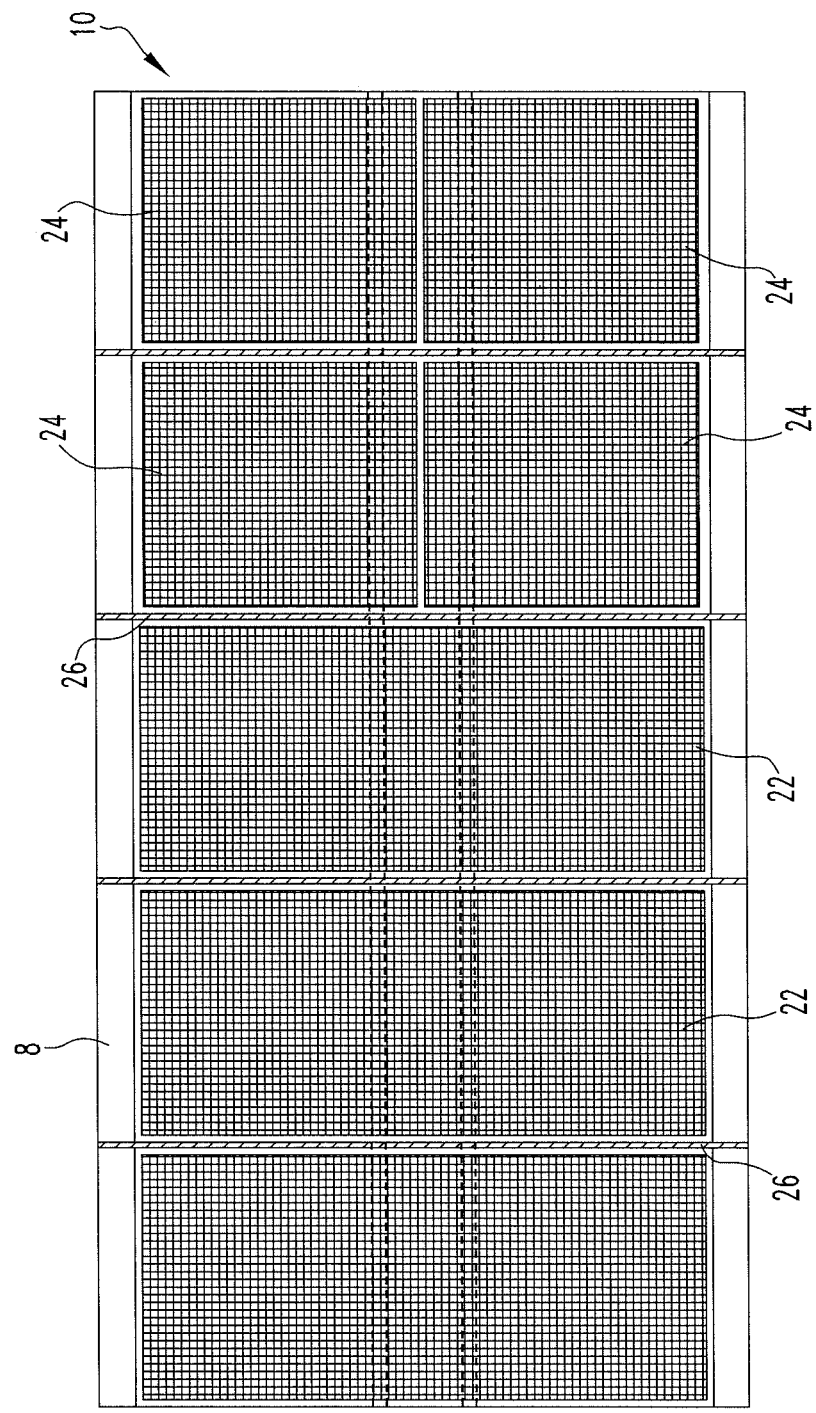
FIG. 2 shows a top view of the magnet retaining assemblies of FIG. 1 with the pole piece retainer removed.
Figure 3:
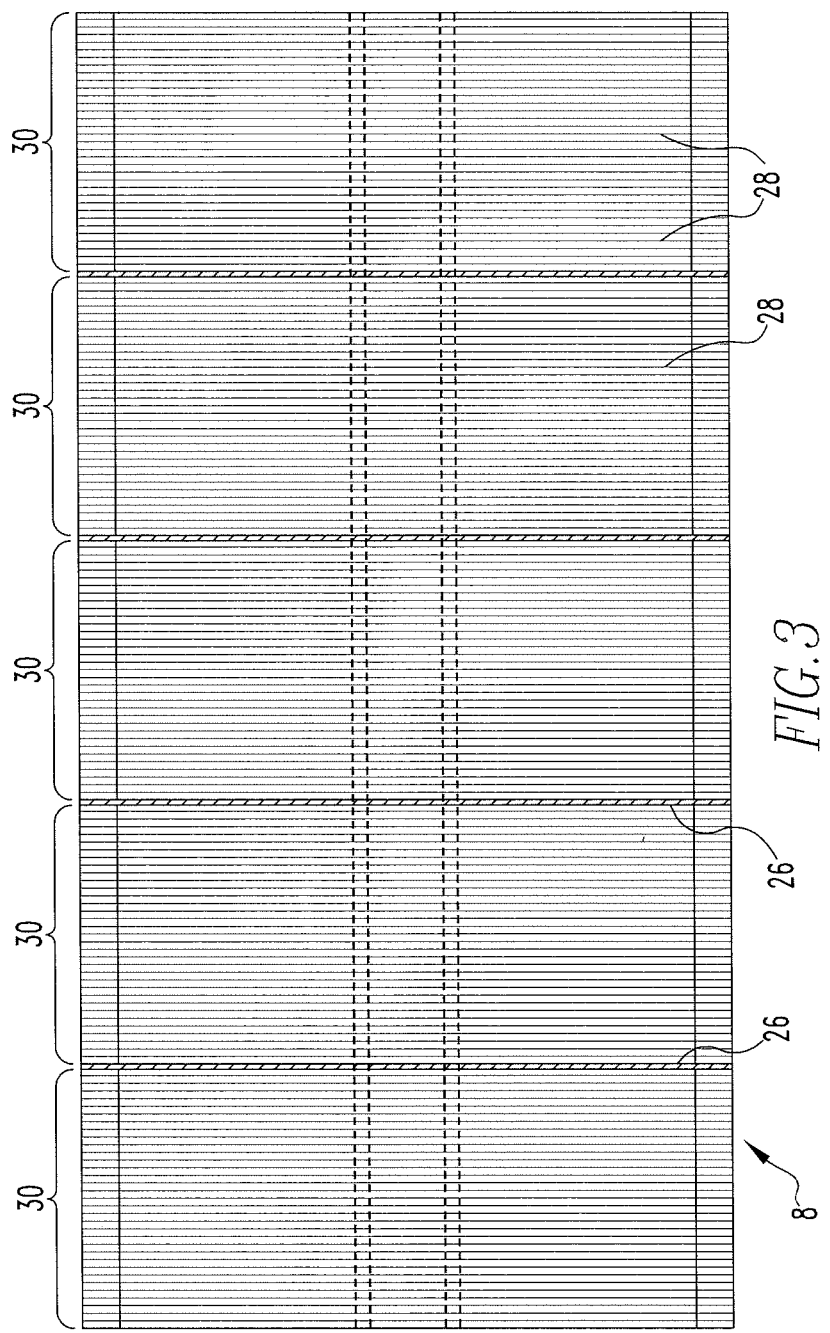
FIG. 3 shows a top view of the magnet retaining assemblies of FIG. 1 with the pole piece retainer and the permanent magnet pole pieces removed.

FIG. 2 is a top view of a single magnet retaining assembly 2 that defines a single pole (e.g. a North pole or a South pole) of the rotor. The pole piece wrapper 12 has been removed for clarity. It can be seen how each pole piece 10 is divided into an array of electrically isolated blocks 22 and 24 of permanent magnet material along its axial length to reduce eddy currents. FIG. 2 also shows how a pole piece can be divided along its circumferential width with blocks 24 being arranged side by side within the same pole piece wrapper. The blocks 22 and 24 are separated in the axial direction by non-magnetic plates 26 that extend radially inwardly into the magnet carrier 8. FIG. 3 is a top view of the single magnet retaining assembly 2 of FIG. 2 but where the blocks 22 and 24 have also been removed for clarity leaving only the laminated magnet carrier 8. The individual laminations 28 of the magnet carrier 8 are formed as a series of axial stacks 30 with adjacent stacks being separated by a nom magnetic plate 26.

Figure 4:
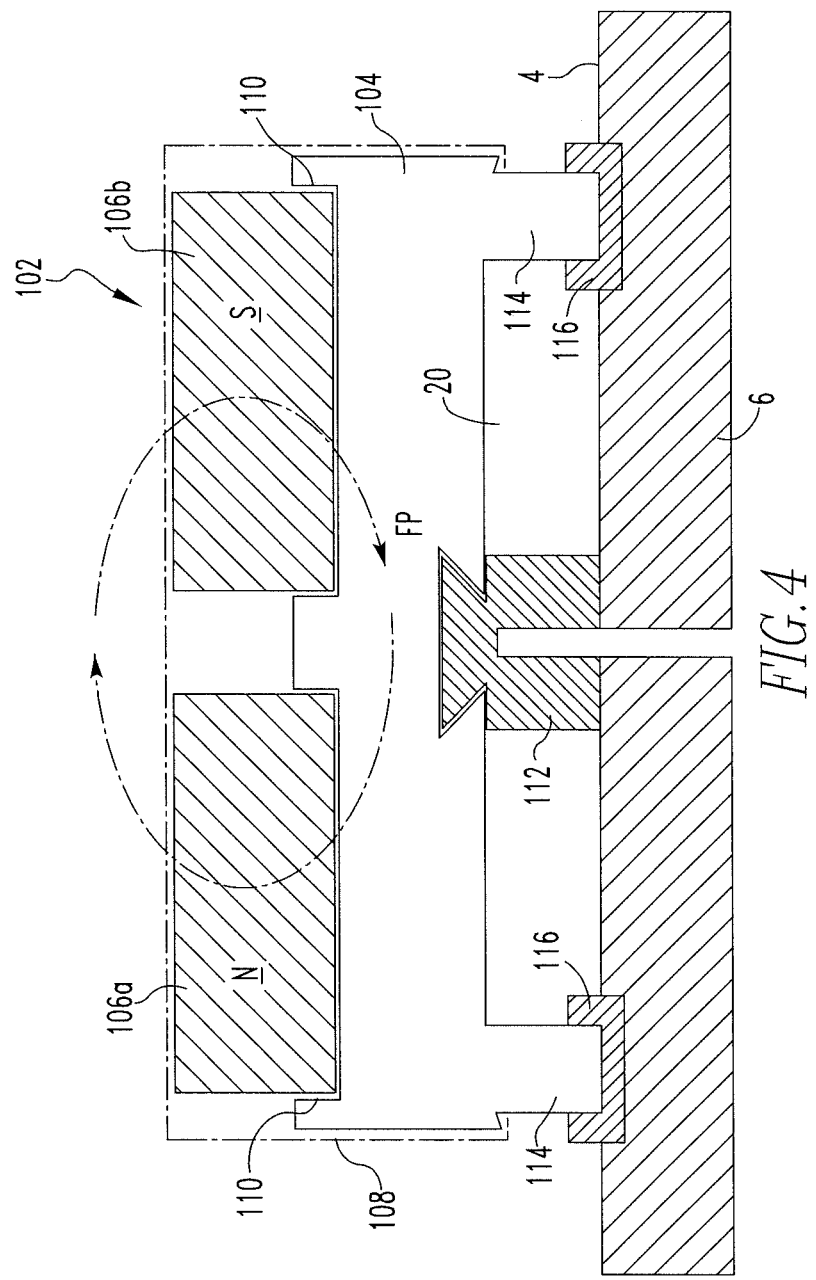
FIG. 4 shows an axial end view of part of a second permanent magnet rotor according to the present invention.

An alternative permanent magnet rotor arrangement is shown in FIG. 4 and includes a circumferential array of magnet retaining assemblies 102 (only one of which is shown) that are secured around the radially outer surface 4 of a rotor drum 6. Each magnet retaining assembly 102 includes a laminated magnet carrier 104. The individual laminations are stamped out from magnetic lamination steel and assembled together to form the magnet carrier in exactly the same way as the first arrangement, The magnet retaining assembly 102 includes a first pole piece 106a that defines a North pole of the rotor and a second pole piece 106b that defines a South pole of the rotor. The pole pieces 106 are arranged side by side and are enclosed by a pole piece wrapper 108 made of a non-magnetic material which provides environmental protection for the permanent magnet material. The overall permanent magnet rotor arrangement is constructed so that circumferentially adjacent pole pieces define alternating North and South poles of the rotor.

Each pole piece 106 is located in a respective shallow recess 110 formed in the radially outer surface of the magnet carrier 104. The construction of the magnet carrier 104 and the individual pole pieces 106 is as described above with reference to the arrangement shown in FIGS. 1 to 3. More particularly, the magnet carrier 104 is laminated, optionally being formed as a series of axial stacks with adjacent stacks being separated by a non-magnetic plate. The pole pieces are divided into an array of electrically isolated blocks of permanent magnet material to reduce eddy currents.

Each magnet carrier 104 is secured relative to the rotor drum by at least one non-magnetic fixing member 112. In practice, each magnet carrier 104 will typically be secured using an axial array of spaced fixing members only one of which is shown. The fixing members 112 are designed to be bolted to the rotor drum and are secured to the magnet carriers 104 by means of a dovetail joint but other fixing methods are possible. Each magnet carrier 104 is also supported by at least one support member. In the arrangement shown in FIG. 4, radially extending support members 114 are located at the circumferential edges of the magnet carrier 104 and are integrally formed with the magnet carrier laminations. Again, in practice, each magnet carrier will typically be supported by an axial array of spaced support members. A non-magnetic spacer 116 is positioned at the base of each support member 114 between the support member and the rotor drum 6. The non-magnetic spacers 116 prevent any flux from extending into the rotor drum. It will be readily appreciated that the same arrangement of integral support members and non-magnetic spacers can be used with the arrangement shown in FIGS. 1 to 3.

The fixing members 112 and support members 114 mount each magnet carrier 104 so that it is radially spaced apart from the outer surface 4 of the rotor drum 6. The radial gaps or spaces 20 between the magnet carriers 104 and the rotor drum 6 define axial passages that can be used to carry ventilation or cooling air into the body of the electrical machine. Flux passes through the pole pieces 106 substantially in the radial direction but very little flux passes across the gap between adjacent magnet carriers (i.e. between the magnet carriers of the adjacent magnet retaining assemblies). The flux path FP does not pass into the rotor drum because the magnet carriers are radially spaced apart from the outer surface 4 of the rotor drum 6 by a sufficient distance and also because of the non-magnetic spacers 116.

What is claimed is:

1. A permanent magnet rotor arrangement comprising:
   a rotor body;
   a circumferential array of magnet carriers, wherein each one of a magnet carrier of the circumferential array of magnet carriers has (i) an outer surface thereof and facing a radial outer surface of the rotor body (ii) a laminated construction, and (iii) axial stacks of laminations including axially adjacent stacks being separated by at least one non-magnetic plate;
   at least one support member corresponding to each magnet carrier and configured to mount each magnet carrier to be radially spaced apart from the radial outer surface of the rotor body by a distance in the radial direction creating a void therebetween and secured to the rotor body for rotation therewith, and each magnet carrier having a surface opposite the outer surface thereof; and
   at least one pole piece made of permanent magnet material located adjacent to the surface of each magnet carrier.

2. The permanent magnet rotor arrangement of claim 1, wherein the magnet carriers are made of magnetic material and are mounted relative to the rotor body at the distance such that flux passes through the pole pieces substantially in the radial direction and flows in the circumferential direction substantially only within the magnet carriers.

3. The permanent magnet rotor arrangement of claim 1, further comprising a pole piece retainer that substantially encloses each pole piece.

4. The permanent magnet rotor arrangement of claim 3, wherein each pole piece retainer further substantially encloses the associated magnet carrier.

5. The permanent magnet rotor arrangement of claim 1, wherein the magnet carriers extend axially along the rim of the rotor body.

6. The permanent magnet rotor arrangement of claim 1, wherein at least one axially extending pole piece of permanent magnet material is located adjacent to the surface of each magnet carrier.

7. The permanent magnet rotor arrangement of claim 1, wherein each pole piece comprises several smaller blocks of permanent magnetic magnet material.

8. The permanent magnet rotor arrangement of claim 7, wherein adjacent blocks of permanent magnet material are separated by at least one non-magnetic plate or lamination.

9. The permanent magnet rotor arrangement of claim 8, wherein the blocks of permanent magnet material are bonded or affixed to the at least one non-magnetic plate or lamination.

10. The permanent magnet rotor arrangement of claim 8, wherein the magnet carriers are mounted to the rotor body by an array of support members.

11. The permanent magnet rotor arrangement of claim 10, wherein the array of support members space the magnet carriers apart from the rotor body in the radial direction to define the void therebetween.

12. The permanent magnet rotor arrangement of claim 10, wherein the array of support members define a circumferential array of axially extending passages for cooling air between the magnet carriers and the rotor body.

13. The permanent magnet rotor arrangement of claim 12, further comprising radially extending passages for cooling air.

14. The permanent magnet rotor arrangement of claim 1, wherein each magnet carrier carries only a single pole piece and flux flows between circumferentially adjacent magnet carriers.

15. The permanent magnet rotor arrangement of claim 1, wherein each magnet carrier carries a plurality of pole pieces.

16. The permanent magnet rotor arrangement of claim 1, wherein the magnet carriers are permanently affixed to the rotor body.

17. The permanent magnet rotor arrangement of claim 1, wherein the magnet carriers are releasably affixed to the rotor body.

18. A permanent magnet rotor arrangement comprising:
a rotor body;
a circumferential array of magnet carriers, each magnet carrier having an outer surface thereof and facing a radial outer surface of the rotor body;
at least one support member corresponding to each magnet carrier and configured to mount each magnet carrier to be radially spaced apart from the radial outer surface of the rotor body by a distance in the radial direction, thereby creating a void therebetween and secured to the rotor body for rotation therewith, and each magnet carrier having a surface opposite the outer surface thereof; and
at least one pole piece made of permanent magnet material located adjacent to the surface of each magnet carrier, wherein each pole piece includes several smaller blocks of permanent magnet material, adjacent blocks of permanent magnet material being separated by at least one non-magnetic plate.

19. A permanent magnet rotor arrangement comprising:
a rotor body;
a circumferential array of magnet carriers, each magnet carrier having an outer surface thereof and facing a radial outer surface of the rotor body;
at least one support member corresponding to each magnet carrier and configured to mount each magnet carrier to be radially spaced apart from the radial outer surface of the rotor body in the radial direction creating a void therebetween and secured to the radial outer surface of the rotor body for rotation therewith, and each magnet carrier having a surface opposite the outer surface;
at least one pole piece made of permanent magnet material located adjacent to the surface of each magnet carrier, wherein each pole piece includes several smaller blocks of permanent magnet material, adjacent blocks of permanent magnet material being separated by at least one non-magnetic plate; and
wherein the void defines an axially extending passage for cooling air between the magnet carriers and the rotor body.

20. The permanent magnet rotor arrangement of claim 19, wherein
each magnet carrier of the circumferential array of magnet carriers is releasably affixed to the rotor body,
wherein each pole piece comprises several smaller blocks of permanent magnet material,
wherein adjacent blocks of permanent magnet material are separated by at least one non-magnetic plate, and
wherein magnet carriers are mounted to the rotor body by an array of support members.

* * * * *